US009846033B2

(12) United States Patent  
Palatshe et al.

(10) Patent No.: US 9,846,033 B2  
(45) Date of Patent: Dec. 19, 2017

(54) LASER LEVEL WITH ADJUSTABLE STAND

(71) Applicant: KAPRO INDUSTRIES LTD., Bikat Beit Hakerem (IL)

(72) Inventors: Yossi Palatshe, Tiberias (IL); Rafi Ben Josef, Bikat Beit Hakerem (IL)

(73) Assignee: KAPRO INDUSTRIES LTD., Bikat Beit Hakerem (IL)

( * ) Notice: Subject to any disclaimer, the term of this patent is extended or adjusted under 35 U.S.C. 154(b) by 0 days.

(21) Appl. No.: 15/534,478

(22) PCT Filed: Dec. 29, 2015

(86) PCT No.: PCT/IL2015/051262  
§ 371 (c)(1),  
(2) Date: Jun. 8, 2017

(87) PCT Pub. No.: WO2016/110837  
PCT Pub. Date: Jul. 14, 2016

(65) Prior Publication Data  
US 2017/0336202 A1     Nov. 23, 2017

(30) Foreign Application Priority Data

Jan. 5, 2015  (IL) .......................................... 236585

(51) Int. Cl.  
*G01C 15/02*     (2006.01)  
*G01C 9/02*      (2006.01)  
(Continued)

(52) U.S. Cl.  
CPC ............. *G01C 9/02* (2013.01); *F16M 11/242* (2013.01); *G01C 15/004* (2013.01)

(58) Field of Classification Search  
CPC ...... G01C 15/00; G01C 15/02; G01C 15/004; F16M 11/242  
(Continued)

(56) References Cited

U.S. PATENT DOCUMENTS 5,690,418 A * 11/1997 Hsiung ................ G01C 15/008  
33/286  
5,983,510 A * 11/1999 Wu ...................... G01C 15/004  
33/227  
(Continued)

FOREIGN PATENT DOCUMENTS

DE     8808431 U1     8/1988  
EP     1357353 A2     10/2003  
(Continued)

OTHER PUBLICATIONS

Written Opinion of the International Searching Authority and International Search Report for PCT/IL2015/051262 issued by the European Patent Office dated Apr. 21, 2016.

*Primary Examiner* — Christopher Fulton  
(74) *Attorney, Agent, or Firm* — Novick, Kim & Lee, PLLC; Harold L. Novick (57) ABSTRACT

A laser level including a laser level body for projecting a laser beam, the laser level body including an adjustable stand having a left frame and a right frame independently manually displaceable between a fully closed frame position for storage purposes and a fully opened frame position for raising the laser level body to a maximum height above a horizontal reference surface. The adjustable stand enables the laser level body to be selectively inclined with respect to the horizontal reference surface.

7 Claims, 7 Drawing Sheets

(51) Int. Cl.
*G01C 15/00* (2006.01)
*F16M 11/24* (2006.01)

(58) Field of Classification Search
USPC .................................................. 33/290, 286
See application file for complete search history.

(56) References Cited

U.S. PATENT DOCUMENTS

| | | | | |
|---|---|---|---|---|
| 6,014,211 A * | 1/2000 | Middleton | ............ | G01C 15/004 356/250 |
| 6,202,313 B1 * | 3/2001 | Yamashita | ............ | G01C 15/105 33/286 |
| 6,640,456 B2 * | 11/2003 | Owoc | ............ | G01C 9/26 33/371 |
| 6,754,969 B2 * | 6/2004 | Waibel | ............ | G01C 15/004 33/281 |
| 6,922,901 B1 * | 8/2005 | Chou | ............ | G01C 15/004 33/279 |
| 6,941,665 B1 * | 9/2005 | Budrow | ............ | G01C 15/008 33/286 |
| 7,237,341 B2 * | 7/2007 | Murray | ............ | G01C 9/06 33/286 |
| 7,266,897 B2 * | 9/2007 | Treichler | ............ | G01C 15/105 33/283 |
| 7,334,341 B2 * | 2/2008 | Donaldson | ............ | G01B 21/047 33/286 |
| 7,412,774 B2 * | 8/2008 | Lu | ............ | G01C 15/004 33/286 |
| 7,797,846 B2 * | 9/2010 | Walser | ............ | A63C 19/06 33/289 |
| 2008/0155842 A1 | 7/2008 | Kallabis | | |

FOREIGN PATENT DOCUMENTS

| | | |
|---|---|---|
| EP | 1860400 A1 | 11/2007 |
| JP | 2008-267825 A | 11/2008 |

\* cited by examiner

LASER LEVEL WITH ADJUSTABLE STAND

FIELD OF THE INVENTION

This present invention relates to laser levels for use in the construction industry and DIY purposes.

BACKGROUND OF THE INVENTION

There are four basic types of laser levels for projecting a laser beam in the form of either a laser line or a laser dot as follows: rotary laser levels for projecting a rotating laser dot to create a 360° laser line, line laser levels for projecting multiple horizontal and vertical laser lines, single line lasers for projecting one solid laser line, and a point generator for projecting a laser dot. Some laser levels are provided with a tripod interface for mounting the laser level on a tripod. Some tripods include a tilting mechanism for tilting a laser level and therefore its one or more laser beams.

High end laser levels are self-leveling so that they can level themselves on slopes typically in the range of 3° to 5°. Most self-leveling lasers include a laser component which hangs like a pendulum and typically either a horizontal or vertical laser beam projecting through a lens or prism. Such self-leveling laser levels include a locking mechanism for securing the pendulum in place when not in use, for example, during transportation and handling. Self-leveling laser levels preferably issue an alert if they are inclined beyond the inclination which they are capable of leveling themselves.

Some construction tasks, for example, tile layout, carpentry, and the like, require an inclined laser beam. Deploying a laser level at an inclination can be achieved by either mounting the laser level on a tiltable tripod which is another item to be transported and handled or placing a laser level on, say, a building block, and the like. The locking mechanism of a self-leveling mechanism is required to be locked when a self-leveling laser level is deployed at an inclination to project an inclined laser beam.

SUMMARY OF THE INVENTION

The present invention is directed towards laser levels including a laser level body for projecting a laser beam and an adjustable stand integrally formed with the laser level body which can be readily manually manipulated to different positions for adjusting the inclination of the laser level body and therefore the laser beam with respect to a horizontal reference surface. The adjustable stand preferably includes a left frame and a right frame intended for independent manipulation between a fully closed frame position and a fully open frame position. The fully closed frame position affords protection to a laser level body and is suitable for storage and transportation. The fully open frame position raises a laser level body with respect to a horizontal reference surface to its maximum height. The intermediate frame positions between the fully frame closed and fully open frame positions can be either predetermined frame positions or non-predetermined frame positions. Discrete intermediate frame positions can be enabled by use of detent arrangements. Non-discrete intermediate frame positions can be enabled by the use of friction, locking means, and the like. The present invention can be equally applied to the aforesaid four types of laser levels. Additionally, the present invention can be readily applied to high end self-leveling laser levels. The locking mechanisms of self-leveling laser levels are necessarily required to be locked during use of the adjustable stand to incline a self-leveling laser level similar to conventional use.

BRIEF DESCRIPTION OF THE DRAWINGS

In order to understand the invention and to see how it can be carried out in practice, preferred embodiments will now be described, by way of non-limiting examples only, with reference to the accompanying drawings in which similar parts are likewise numbered, and in which.

DETAILED DESCRIPTION OF THE DRAWINGS

FIGS. 1 to 4 show a self-leveling laser level 10 includes a generally rectangular parallelepiped laser level body 11 having a generally flat top surface 12 with an operator panel 13 including an ON/OFF switch, and the like, a generally flat base surface 14 opposite the generally flat top surface 12 and a peripheral surface 16. The peripheral surface 16 includes a generally flat front surface 17A, a generally flat back surface 17B opposite the generally flat front surface 17A, a generally flat left side surface 17C and a generally flat right side surface 17D opposite the generally flat left side surface 17C.

The top surface 12 joins the left side surface 17C at a left top horizontal juncture 18A and the right side surface 17D at a right top horizontal juncture 18B. The left top horizontal juncture 18A includes an elongated left top groove 19A and the right top horizontal juncture 18B includes an elongated right top groove 19B.

The front surface 17A joins the left side surface 17C at a left front upright juncture 21A and the right side surface 17D at a right front upright juncture 21B. The back surface 17B joins the left side surface 17C at a left back upright juncture 21C and the right side surface 17D at a right back upright juncture 21D.

The laser level 10 includes an internal pendulum-like laser component 22 for projecting a laser cross beam 23 through a window 24 in the front surface 17A. The laser cross beam 23 includes a vertical laser line 26 and a horizontal laser line 27 when the laser level 10 is operated on a horizontal reference surface. The laser level 10 includes a locking mechanism 28 with two operative positions ON and OFF for respectively unlocking and locking the pendulum-like laser component 22.

Figure 1:
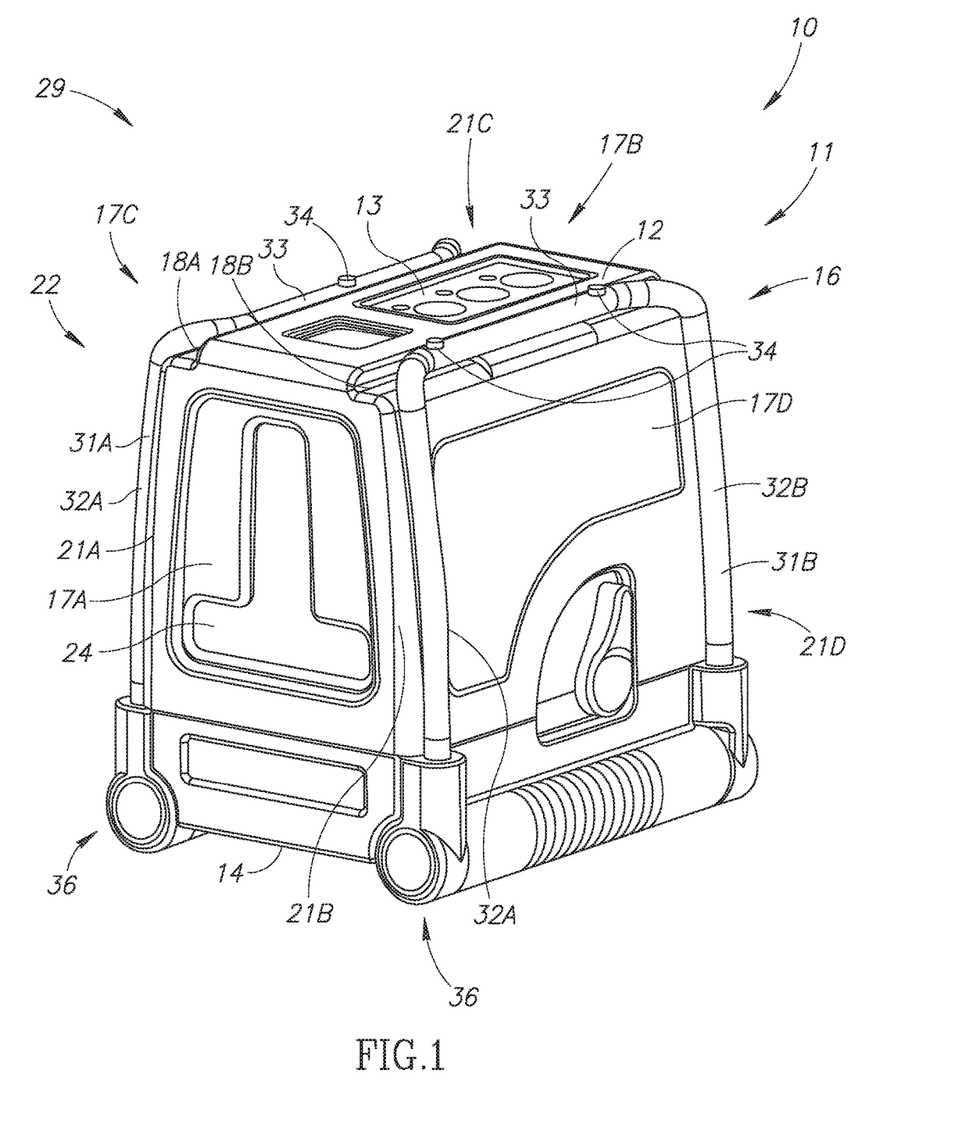
FIG. 1 is a front perspective view of a self-leveling laser level for projecting a laser cross beam with an adjustable stand including a left frame and a right frame in fully closed frame positions in accordance with a first embodiment of the present invention.

The laser level 10 includes an adjustable stand 29 integrally formed with the laser level body 11. The adjustable stand 29 includes a pair of U-shaped wire frame structures 31 hereinafter referred to as a left frame 31A and a right frame 31B. The frames 31 each include a front leg 32A and a back leg 32B and a cross member 33 extending therebetween. The frames 31 are pivotal mounted on opposite sides of the base surface 14 such that the left frame 31A is flush against the left side surface 17C and the right frame 31B is flush against the right side surface 17D in their fully closed frame positions as shown in FIG. 1. The left front leg 32A is flush against the left front upright juncture 21A, the left cross member 33 is snug fit into the elongated left top groove 19A and the left back leg 32B is flush against the left back upright juncture 21C to form a protective surround for the left side surface 17C. The right front leg 32A is flush against the right front upright juncture 21B, the right cross member 33 is snug fit into the elongated right top groove 19B and the right back leg 32B is flush against the right back upright juncture 21D to form a protective surround for the right side surface 17D. The fully closed frame positions of the frames 31 are denoted P1 and are suitable for storage and transportation and afford protection to the laser level body 11. The cross members 33 are preferably fitted with three rubber supports 34 for stabilizing the laser level 10 on a horizontal reference surface.

Figure 2:
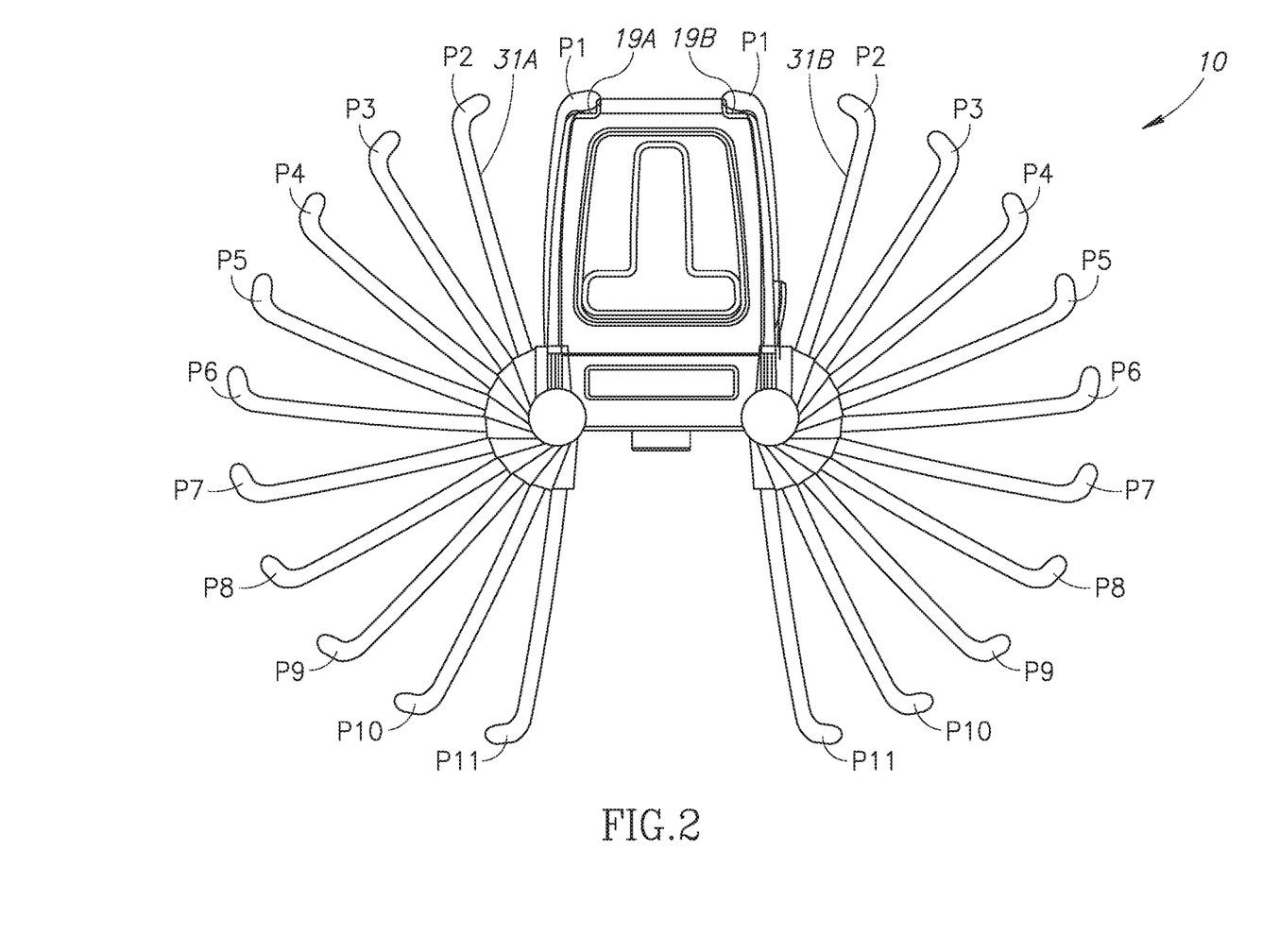
FIG. 2 is a front elevation view of the self-leveling laser level showing nine intermediate frame positions of the left frame and the right frame and their fully open frame positions.

The frames 31 each includes a click-lock detent arrangement 36 for determining, say, a 15° angle between adjacent discrete frame positions such that each frame 31 has a total of nine intermediate frame positions denoted P2, P3, . . . , P9 between their fully closed frame positions P1 and fully open frame positions P11 for changing the inclination of the laser level body 11 and accordingly its laser cross beam 23 relative to a horizontal reference surface. The fully open frame positions P11 of the adjustable stand 29 raise the laser level body 11 to its maximum height with respect to a horizontal reference surface. The frames 31 can be positioned independently such that the laser level 10 can be positioned at a wide range of different angles relative to a horizontal reference surface. The frames 31 have a significantly wider footprint than the laser level body 11 in their intermediate frame positions and their fully open frame positions thereby affording greater stability to the laser level 10 particularly when positioning the laser level 10 at a relatively large inclination, say, in the region of 30° and greater, to a horizontal reference surface.

Figure 3:
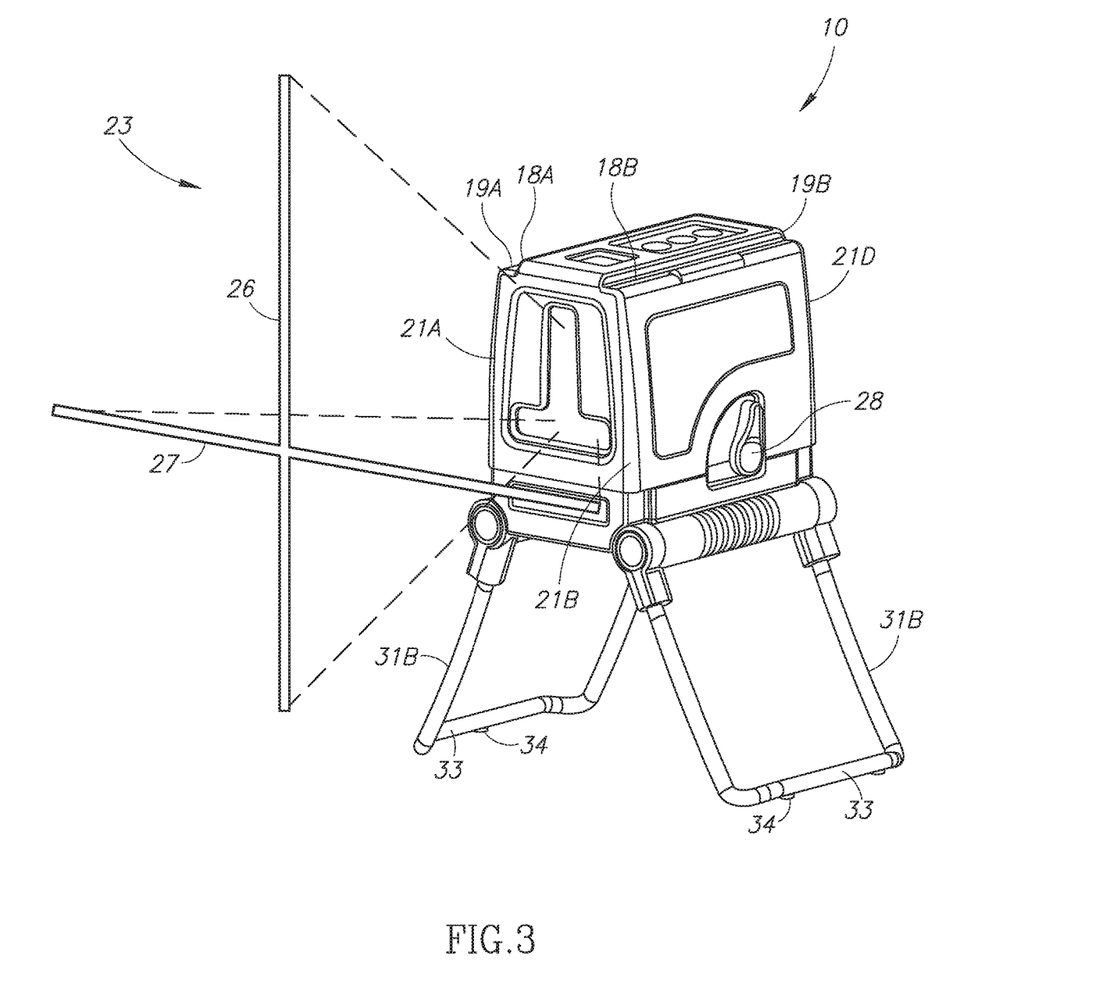
FIG. 3 is a front perspective view showing the use of the self-leveling laser level with an unlocked self-leveling laser component for projecting a laser cross beam with a horizontal laser beam parallel to a horizontal reference surface.
Figure 4:
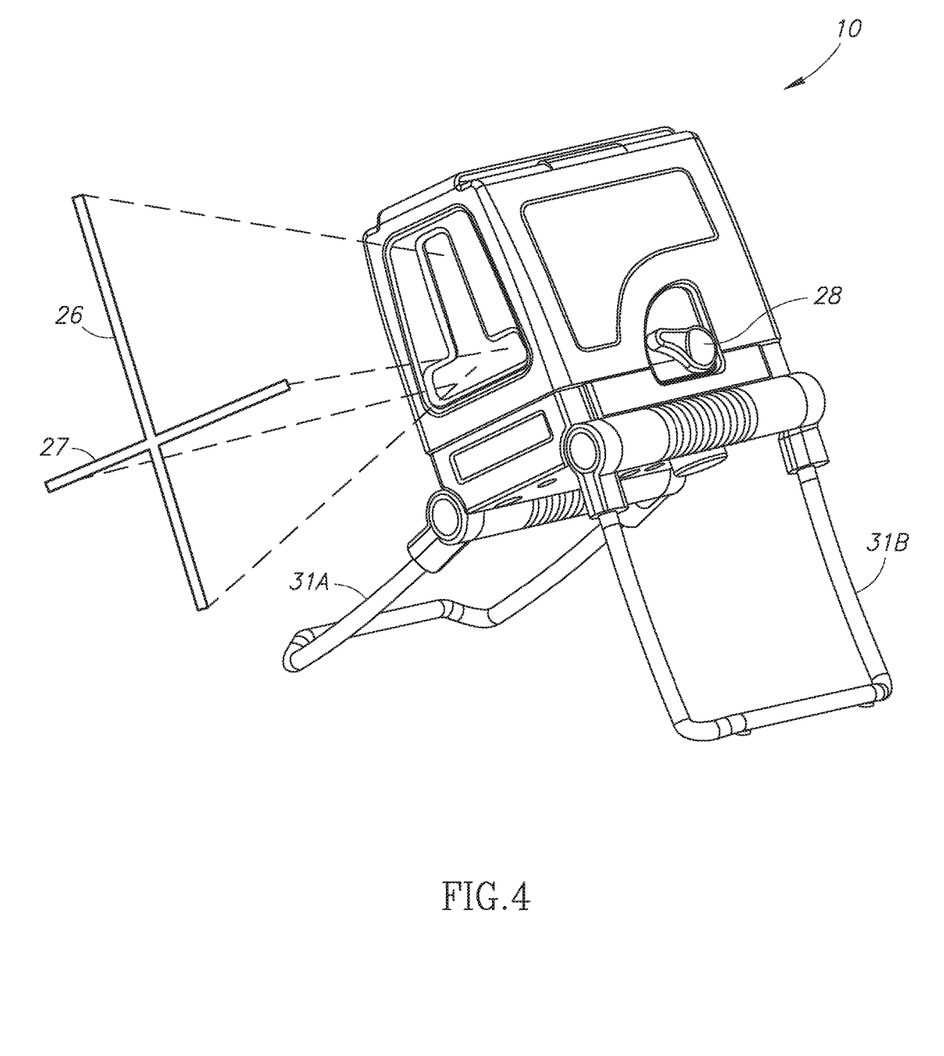
FIG. 4 is a front perspective view of the use of the self-leveling laser level with a locked self-leveling laser component for projecting a laser cross beam with a horizontal laser beam inclined with respect to a horizontal reference surface.

Self-leveling can be used in the eleven positions of the adjustable stand 29 in which the frames 31 are placed in the same position. FIG. 3 shows the use of the self-leveling laser level 10 with its two frames 31 in the same frame position P8 and the locking mechanism 28 unlocked for projecting the laser cross beam 23 with its horizontal laser beam 27 parallel to a horizontal reference surface. FIG. 4 shows exemplary use of the laser level 10 with its left frame 31A in its frame position P7, its right frame 31B in its frame position P10 and the locking mechanism 28 locked for projecting the laser cross beam 23 with its horizontal laser beam 27 inclined with respect to a horizontal reference surface.

Figure 5:
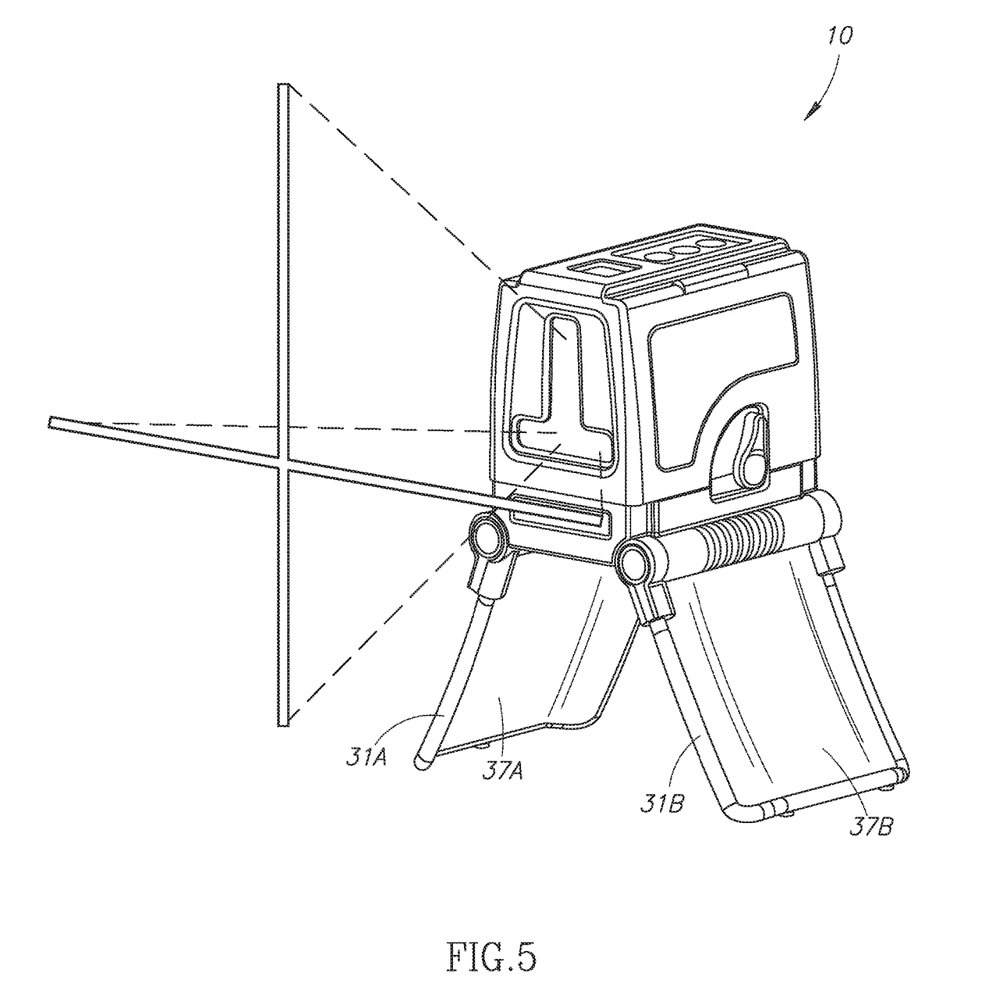
FIG. 5 is a front perspective view showing a self-leveling laser level for projecting a laser cross beam with an adjustable stand in fully open frame positions in accordance with a second embodiment of the present invention.

FIG. 5 shows the self-leveling laser level 10 with its left frame 31A including a left panel 37A and its right frame 31B including a right panel 37B such that the panels 37A and 37B protect the entire left side surface 17C and right side surface 17D in their fully closed frame positions.

Figure 6:
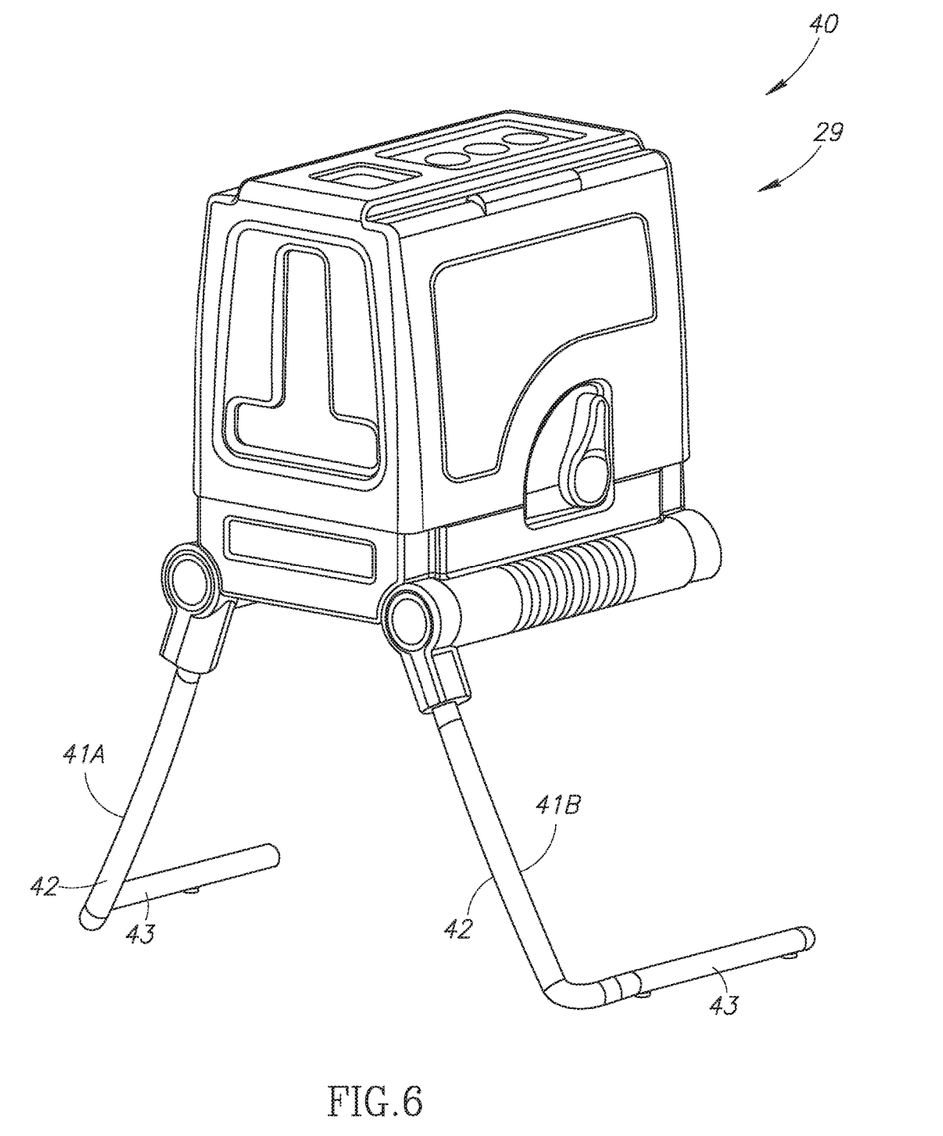
FIG. 6 is a front perspective view of a self-leveling laser level for projecting a laser cross beam with an adjustable stand in fully open frame positions in accordance with a third embodiment of the present invention.

FIG. 6 shows a self-leveling laser level 40 similar in construction and operation as the self-leveling laser level 10 and therefore similar parts are likewise numbered. The latter 40 differs from the former 10 insofar as its adjustable stand 29 includes L-shaped wire frames 41 each having a front leg 42 and a cross member 43 extending therefrom towards the laser level body 11. Alternatively, the L-shaped frames 41 can be formed with a back leg and a cross member extending therefrom towards the laser level body.

Figure 7:
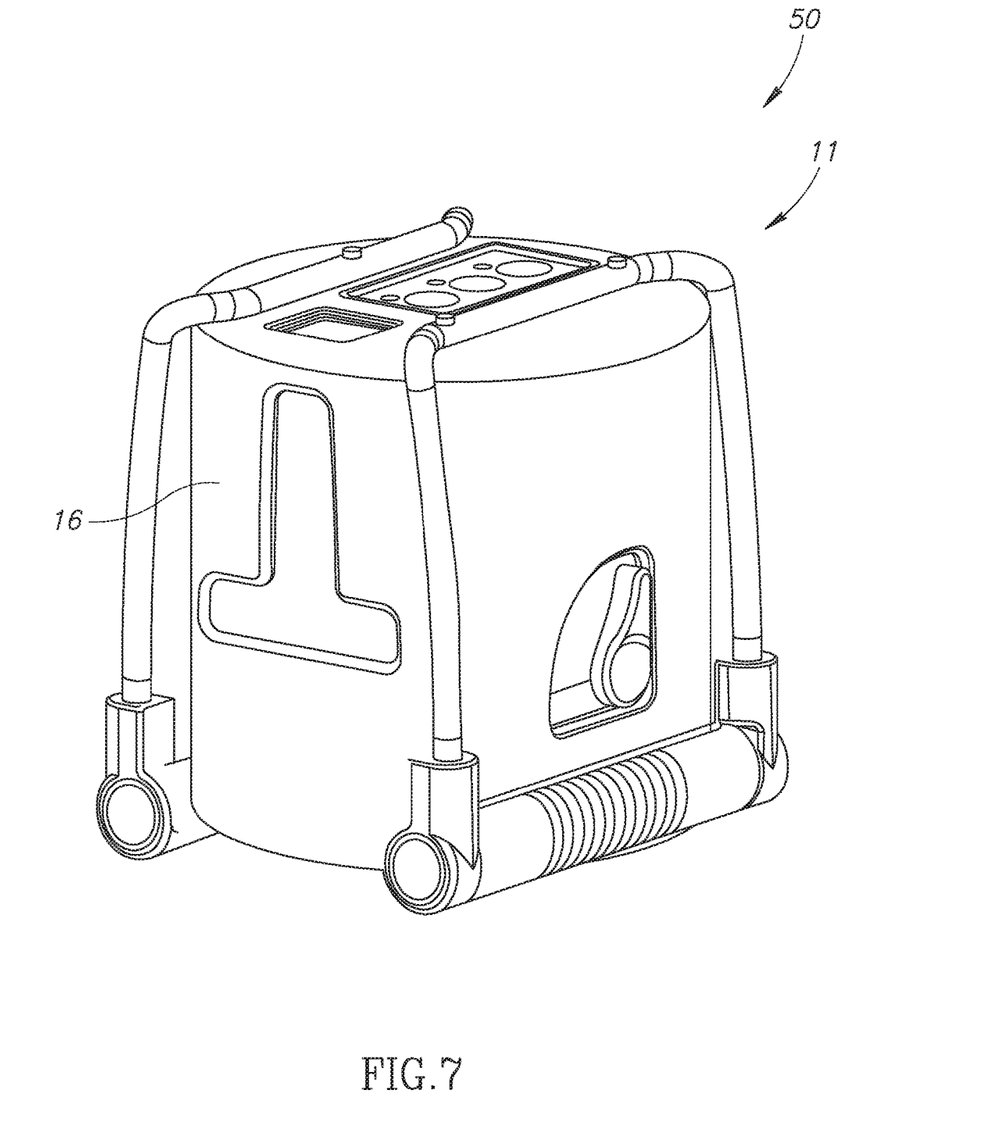
FIG. 7 is a front perspective view of a self-leveling laser level for projecting a laser cross beam with an adjustable stand in fully closed frame positions in accordance with a fourth embodiment of the present invention.

FIG. 7 shows a self-leveling laser level 50 similar in construction and operation as the self-leveling laser level 10 and therefore similar parts are likewise numbered. The latter 50 differs from the former 10 insofar as its laser level body 11 has a generally cylindrical shape including a generally right cylindrical peripheral surface 16.

While particular embodiments of the present invention are illustrated and described, it would be obvious to those skilled in the art that various other changes and modifications can be made without departing from the spirit and scope of the invention.

The invention claimed is:

1. A laser level for placing on a horizontal reference surface, the laser level comprising:
  (a) a laser level body for projecting a laser beam, said laser level body having a generally flat top surface, a generally flat base surface opposite said generally flat top surface, and a peripheral surface; and
  (b) an adjustable stand including:
    i) a left frame having a left leg pivotal on said laser level body and a left cross member extending from said left leg towards said laser level body, said left frame being independently manually pivotal on said laser level body to a multitude of intermediate frame positions between a fully closed frame position in which said left frame is flush against said peripheral surface and a fully open frame position, and
    ii) a right frame having a right leg pivotal on said laser level body and a right cross member extending from said right leg towards said laser level body, said right frame being independently manually pivotal on said laser level body to a multitude of intermediate frame positions between a fully closed frame position in which said right frame is flush against said peripheral surface and a fully open frame position,
  said adjustable stand capable of selectively inclining said laser level body with respect to the horizontal reference surface and raising said laser level body to a maximum height above the horizontal reference surface in said fully open frame positions of said left frame and said right frame.

2. The level according to claim 1 wherein said top surface includes an elongated left top groove and an elongated right top groove opposite said elongated left top groove, said elongated left top groove snugly receiving said left cross member in said fully closed frame position and said elongated right top groove snugly receiving said right cross member is in said fully closed frame position.

3. The level according to claim 2 wherein said left frame has a U-shaped wire frame structure including an additional leg opposite said left leg and said right frame has a U-shaped wire frame structure including an additional leg opposite said right leg.

4. The level according to claim 2 wherein said left frame includes a left panel and said right frame includes a right panel.

5. The level according to claim 1 wherein said left frame has a U-shaped wire frame structure including an additional leg opposite said left leg and said right frame has a U-shaped wire frame structure including an additional leg opposite said right leg.

6. The level according to claim 5 wherein said left frame includes a left panel and said right frame includes a right panel.

7. The level according to claim 1 wherein said left frame includes a left panel and said right frame includes a right panel.

\* \* \* \* \*